US011869444B2

(12) United States Patent
Park et al.

(10) Patent No.: US 11,869,444 B2
(45) Date of Patent: Jan. 9, 2024

(54) DISPLAY DEVICE HAVING A CLOCK TRAINING WITH A PLURALITY OF SIGNAL LEVELS AND DRIVING METHOD THEREOF

(71) Applicant: SAMSUNG DISPLAY CO., LTD., Yongin-si (KR)

(72) Inventors: Chae Hee Park, Yongin-si (KR); Jong Soo Kim, Yongin-si (KR); Heen Dol Kim, Yongin-si (KR); Ji Ye Lee, Yongin-si (KR); Young Suk Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 64 days.

(21) Appl. No.: 17/815,590

(22) Filed: Jul. 28, 2022

(65) Prior Publication Data

US 2023/0162689 A1 May 25, 2023

(30) Foreign Application Priority Data

Nov. 19, 2021 (KR) ........................ 10-2021-0160770

(51) Int. Cl.
*G09G 3/3275* (2016.01)

(52) U.S. Cl.
CPC ... *G09G 3/3275* (2013.01); *G09G 2310/0272* (2013.01); *G09G 2310/08* (2013.01)

(58) Field of Classification Search
CPC .................................................... G09G 3/3275
USPC ......................................................... 345/204
See application file for complete search history.

(56) References Cited

U.S. PATENT DOCUMENTS

2019/0333465 A1* 10/2019 Im ........................ G09G 3/2096
2020/0184877 A1* 6/2020 Pyun .................... G09G 3/2092
2021/0201734 A1* 7/2021 Kim ......................... G09G 3/20

FOREIGN PATENT DOCUMENTS

KR 10-2018-0032740 4/2018
KR 10-1988920 6/2019

* cited by examiner

*Primary Examiner* — Long D Pham
(74) *Attorney, Agent, or Firm* — F. Chau & Associates, LLC

(57) ABSTRACT

A display device includes a timing controller for supplying a clock training signal through a data clock signal line in a first period of one frame period, and supplying image data through the data clock signal line in a second period of the one frame period, a data driver for generating a clock signal, based on the clock training signal in a clock training period in the first period, and generating a data signal, based on the clock signal and the image data in the second period, and a pixel unit for displaying an image, based on the data signal. The clock training signal includes a plurality of signal levels, and the data driver determines the clock training period, based on the signal levels of the clock training signal.

19 Claims, 9 Drawing Sheets

<VBP>

DISPLAY DEVICE HAVING A CLOCK TRAINING WITH A PLURALITY OF SIGNAL LEVELS AND DRIVING METHOD THEREOF

CROSS-REFERENCE TO RELATED APPLICATION

The present application claims priority under 35 U.S.C. § 119(a) to Korean patent application 10-2021-0160770 filed on Nov. 19, 2021 in the Korean Intellectual Property Office, the disclosure of which is incorporated by reference in its entirety herein.

1. Technical Field

The present disclosure generally relates to a display device and a method of driving the same.

2. Discussion of Related Art

Electronic devices such as smart phones, digital cameras, notebook computers, navigation systems, and smart televisions, include display devices for displaying images. The display device includes a display panel that generates and displays an image, and various input devices.

The display device may further include a timing controller and a data driver. The timing controller and the data driver may transmit/receive signals required to drive the display device through an interface.

SUMMARY

At least one embodiment provides a display device in which the number of signal lines for signal transmission is minimized.

In accordance with an embodiment of the present disclosure, there is provided a display device including: a timing controller, a data driver, and a pixel unit. The timing controller is configured to supply a clock training signal through a data clock signal line in a first period of one frame period, and supply image data through the data clock signal line in a second period of the one frame period. The data driver is configured to generate a clock signal, based on the clock training signal in a clock training period in the first period, and generate a data signal, based on the clock signal and the image data in the second period. The pixel unit is configured to display an image, based on the data signal. The clock training signal includes a plurality of signal levels. The data driver determines the clock training period, based on the signal levels of the clock training signal.

The clock training signal may include a first bit and a second bit, which correspond to each of the signal levels. The data driver may determine the clock training period, based on the first bit of the clock training signal.

The first bit of the clock training signal may have a first value in the clock training period in the first period, and have a second value in a period except the clock training period in the first period.

The data driver may determine, as the clock training period, a period in which the first bit of the clock training signal has the first value in the first period.

The data driver may determine, as the clock training period, a period between times at which the first bit of the clock training signal is changed in the first period.

The data driver may generate the clock signal, corresponding to the second bit of the clock training signal in the clock training period.

The clock training signal may have a predetermined signal level in sub-periods different from the clock training period in the first period.

The data driver may extract the sub-periods, based on the predetermined signal level, and determine a period between the sub-periods as the clock training period.

The sub-periods may include a first sub-period and a second sub-period. The clock training signal has one signal level among a first signal level, a second signal level greater than the first signal level, a third signal level greater than the second signal level, and a fourth signal level greater than the third signal level.

The clock training signal may have the first signal level in the first sub-period and the second sub-period.

The clock training signal may have a signal level which sequentially decreases from the third signal level to the first signal level in the first sub-period, and have a signal level which sequentially increases from the first signal level to the third signal level in the second sub-period.

The clock training signal may have the second signal level or the third signal level in the clock training period, and have the fourth signal level in a period except the first sub-period, the second period, and the clock training period in the first period.

The data driver may generate the clock signal, corresponding to the clock training signal having the second signal level or the third signal level in the clock training period.

The clock training signal may include 2-bit signal levels.

The data driver may include a plurality of data driving circuits. The data clock signal line may include a plurality of sub-data clock signal lines. The timing controller may be connected to the data driving circuits respectively through the plurality of sub-data clock signal lines.

In accordance with an aspect of the present disclosure, there is provided a method of driving a display device, the method including: supplying a clock training signal including a plurality of signal levels through a data clock signal line in a first period of one frame period; supplying image data through the data clock signal line in a second period of the one frame period; determining a clock training period in the first period, based on the signal levels of the clock training signal; generating a clock signal, based on the clock training signal in the clock training period in the first period; generating a data signal, based on the clock signal and the image data in the second period; and displaying an image, based on the data signal.

The clock training signal may include a first bit and a second bit, which correspond to each of the signal levels. In the determining of the clock training period, the clock training period may be determined based on the first bit of the clock training signal.

In the generating of the clock signal, the clock signal may be generated corresponding to the second bit of the clock training signal.

The clock training signal may have a predetermined signal level in sub-periods different from the clock training period in the first period.

In the determining of the clock training period, the sub-periods may be extracted based on the predetermined signal level, and a period between the sub-periods may be determined as the clock training period.

DETAILED DESCRIPTION

Figure 1:
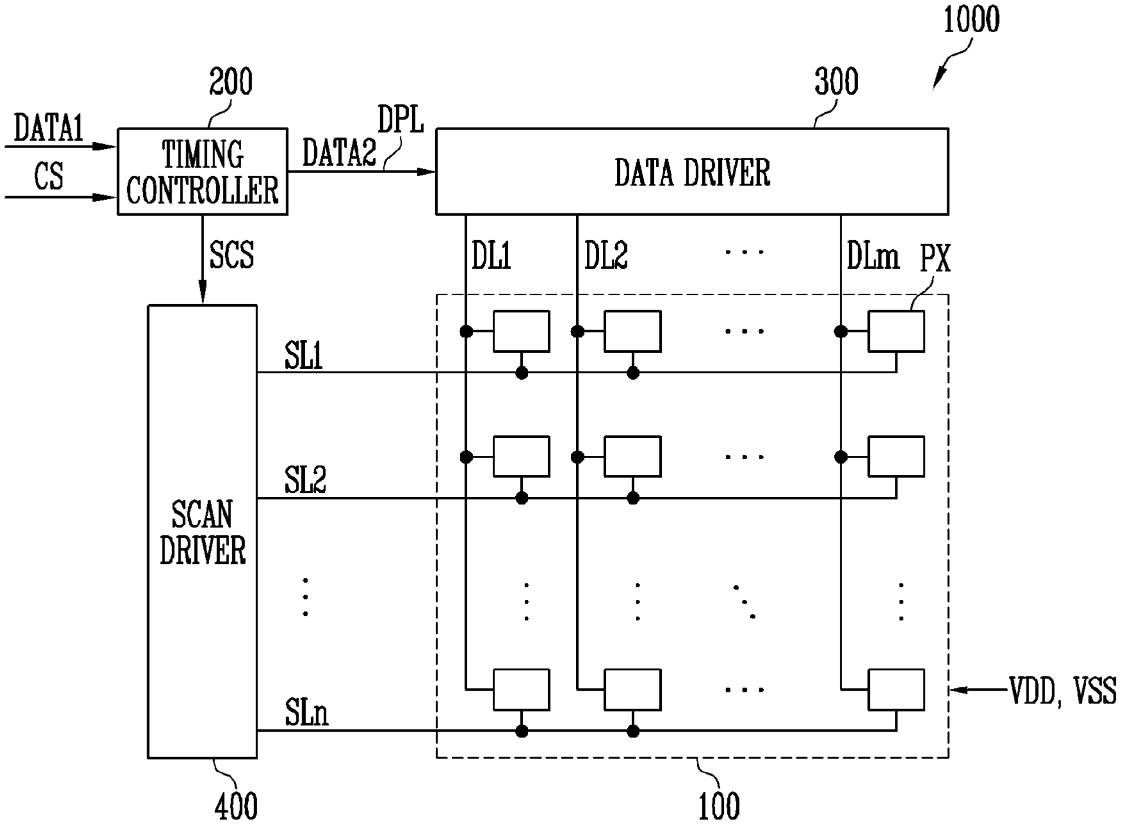
FIG. 1 is a block diagram illustrating a display device in accordance with an embodiment of the present disclosure.

Hereinafter, exemplary embodiments of the present disclosure will be described in more detail with reference to the accompanying drawings. Throughout the drawings, the same reference numerals are given to the same elements, and their overlapping descriptions will be omitted. However, the present disclosure is not limited to the embodiments disclosed below, but may be implemented in various different forms.

It will be understood that, when an element or a layer is referred to as being "on" another element or layer, it may be directly or indirectly on the other element or layer. That is, for example, intervening elements or layers may be present therebetween.

It will be understood that although the terms "first," "second," "third," "fourth," etc. may be used herein to describe various elements, these elements should not be limited by these terms. These terms are only used to distinguish one element from another. Therefore, it will be understood that a first element as used herein may be one of a second element, a third element, and a fourth element within the technical spirit of the present disclosure.

FIG. 1 is a block diagram illustrating a display device in accordance with an embodiment of the present disclosure.

Referring to FIG. 1, the display device 1000 in accordance with an embodiment of the present disclosure may include a pixel unit 100 (or display panel), a timing controller 200 (e.g., a control circuit), a data driver (e.g., a driver circuit) 300, and a scan driver 400 (e.g., a driver circuit).

The pixel unit 100 may include a plurality of scan lines SL1 to SLn (n is an integer greater than 0), a plurality of data lines DL1 to DLm (m is an integer greater than 0), and a plurality of pixels PX.

Each of the pixels PX may be connected to at least one of the scan lines SL1 to SLn and at least one of the data lines DL1 to DLm. Each of the pixels PX may emit light with a luminance corresponding to a data signal provided through a corresponding data line in response to a scan signal provided through a corresponding scan line. Meanwhile, the pixels PX may be supplied with voltages of a first power source VDD and a second power source VSS from the outside. The first power source VDD and the second power source VSS are voltages for an operation of the pixels PX. For example, the first power source VDD may have a voltage level higher than a voltage level of the second power source VSS.

The timing controller 200 may receive a control signal CS and first data DATA1 from the outside (e.g., a graphic processor). The control signal CS may include a clock signal, a vertical synchronization signal, a horizontal synchronization signal, and the like.

The timing controller 200 may generate a scan control signal SCS, based on the control signal CS, and supply the scan control signal SCS to the scan driver 400.

Also, the timing controller 200 may generate second data DATA2, based on the control signal CS and the first data DATA1, and supply the second data DATA2 to the data driver 300 through a data clock signal line DPL.

In an embodiment, the timing controller 200 supplies a data control signal as the second data DATA2 to the data driver 300, corresponding to a first period of one frame period, and supplies image data as the second data DATA2 to the data driver 300, corresponding to a second period of the one frame period. During one frame period, image data is supplied to each pixel row of the pixel unit 100. For example, the second data DATA2 may be configured as one packet data including the data control signal corresponding to the first period and the image data corresponding to the second period, to be supplied to the data driver 300 through the data clock signal line DPL.

The first period and the second period may be different periods. The first period may be a vertical blank period, and the second period may be an active data period. The vertical blank period may be a transitional period in which a next frame advances without supplying any image data. For example, image data is not supplied to the pixel unit 100 during the vertical blank period. The active data period may be a supply period of image data corresponding to an image to be displayed by the pixel unit 100. For example, image data is supplied to the pixel unit 100 during the active data period The data control signal may include a signal, e.g., a clock training signal or the like, which is used for an initialization operation of the data driver 300. The clock training signal may include a clock training pattern. In addition, the image data may include pixel data and the like.

In some embodiments, the second data DATA2 may be configured as packet data in a multi-level signal modulation format. For example, the second data DATA2 may be configured as packet data in a pulse amplitude modulation 4-level (PAM4) format. The second data DATA2 may have four signal levels (or voltage levels), and include a first bit (e.g., a most significant bit (MSB)) and a second bit (e.g., a least significant bit (LSB)). In an example, the signal levels of the second data DATA2 may correspond to 2-bit data, i.e., values of '00,' '01,' '10,' and '11.' '00' may mean a value in which an LSB is 0 and an MSB is 0, '01' may mean a value in which an LSB is 1 and an MSB is 0, '10' may mean a value in which an LSB is 0 and an MSB is 1, and '11' may mean a value in which an LSB is 1 and an MSB is 1. The MSB may correspond to a bit position having a highest value of the second data DATA2, and the LSB may correspond to a bit position having a lowest value of the second data DATA2.

In an embodiment, the clock training signal (or data control signal) of the second data DATA2 may have different signal levels in a clock training period in the first period and a period except the clock training period of the first period. For example, the clock training signal may have a first pattern insides the clock training period and a second other pattern outside the clock training period. The clock training period may mean a period in which the data driver 300 which will be described later as generating (or recovering) a clock signal, based on the clock training signal of the second data DATA2, in at least a partial period of the first period.

For example, when the second data DATA2 is configured with the above-described packet data in the PAM4 format, the MSB of the clock training signal of the second data DATA2 may have a value (or first value) of 0 in the clock training period of the first period, and have a value (or second value) of 1 in the period except the clock training period of the first period.

Also, the clock training signal of the second data DATA2 may include LSBs having the value (first value or second value) of 0 or 1, corresponding to the clock training pattern in the clock training period.

However, embodiments of the present disclosure are not limited thereto, and the clock training signal of the second data DATA2 may include various signal levels (or bits), corresponding to the clock training period. For example, the clock training signal may include signal levels (or bits) having a predetermined specific pattern at the front/back of the clock training period.

The signal levels (or bits) of the second data DATA2 will be described in detail with reference to FIGS. 4A, 4B, 5, 6, and 7A to 7C.

The data driver 300 may generate (or recover) a clock signal, based on the second data DATA2, in the clock training period in the first period (or vertical blank period). For example, the data driver 300 may include a clock data recovery (CDR) circuit, and the CDR circuit may generate a clock signal, based on the clock training signal of the second data DATA2.

The data driver 300 may determine the clock training period of the first period, based on the signal level of the clock training signal.

In an embodiment, the data driver 300 may determine the clock training period, based on the MSB of the clock training signal.

For example, when the MSB of the clock training signal has the value of 0 in the clock training period in the first period and has the value of 1 in the period except the clock training period in the first period as described above, the data driver 300 may determine, as the clock training period, a period in which the MSB of the clock training signal is 0 in the first period.

In another example, the data driver 300 may determine, as the clock training period, a period between times at which the MSB of the clock training signal is changed in the first period. In an example, when the MSB of the clock training signal has the value of 0 in the clock training period in the first period and has the value of 1 in the period except the clock training period of the first period, the data driver 300 may determine a time at which the MSB of the clock training signal is changed from the value of 1 to the value of 0 in the first period as a time at which the clock training period is started, and determine a time at which the MSB of the clock training signal is changed from the value of 0 to the value of 1 in the first period as a time at which the clock training period is ended. For example, the duration of the clock training period may between a first transition of the MSB of the clock training signal and a second transition of the MSB of the clock training signal. For example, the first transition may be when the MSB is changed from 1 to 0 and the second transition may be when the MSB is changed from 0 to 1.

In an embodiment, the data driver 300 determines the clock training period, based on the signal levels (or bits) of the predetermined specific pattern which the clock training signal has.

For example, as described above, when the clock training signal includes signal levels having a predetermined specific pattern at the front/back of the clock training period, the data driver 300 may determine the clock training period, based on the signal levels of the specific pattern. For example, the front may occur adjacently before a beginning the clock training period and the back may occur adjacently after an end of the clock training period.

In the second period (or active data period), the data driver 300 may generate data signals, based on the second data DATA2. For example, the data driver 300 may generate data signals, based on the image data included in the second data DATA2 and the clock signal generated (or recovered) in the first period. The data driver 300 may supply the data signals to the data lines DL1 to DLm.

As described above, the timing controller 200 and the data driver 300 may transmit/receive the second data DATA2 in the multi-level signal modulation format, and the data driver 300 may determine the clock training period by using the signal levels of the second data DATA2. Thus, it is unnecessary for the timing controller 200 to provide a separate signal for clock training period notification to the data driver 300. Accordingly, a separate signal line (e.g., a shared forward channel (SFC)) between the timing controller 200 and the data driver 300 for providing a clock training period notification signal can be omitted. Accordingly, the number of signal lines for signal transmission between the timing controller 200 and the data driver 300 can be decreased.

The scan driver 400 may receive the scan control signal SCS from the timing controller 200, and supply scan signals to the scan lines SL1 to SLn, based on the scan control signal SCS. For example, the scan signals may be sequentially supplied to the scan lines SL1 to SLn. The scan signals may be sequentially supplied during the image frame period.

The scan signal may be set to a gate-on voltage (e.g., a low voltage or a high voltage). A transistor receiving the scan signal may be set to a turn-on state when the scan signal is supplied. The transistor may be located in each of the pixels PX.

Figure 2:
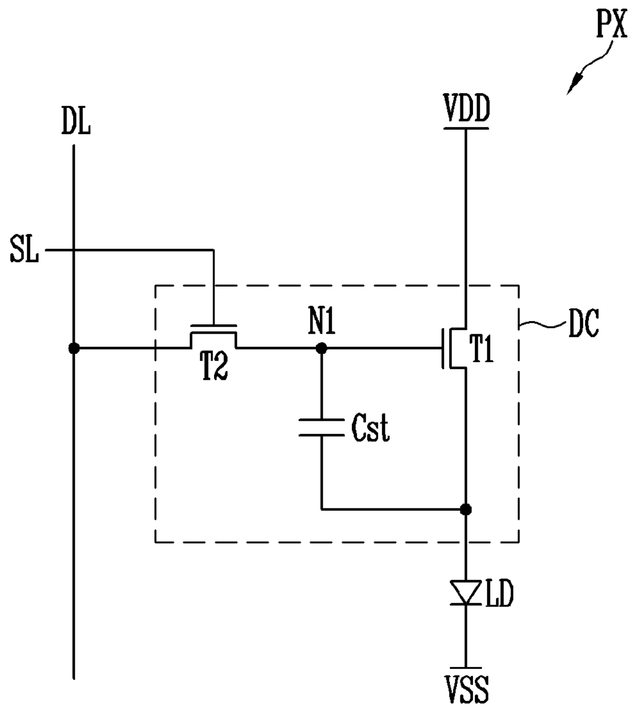
FIG. 2 is a circuit diagram illustrating an example of a pixel included in the display device shown in FIG. 1.

FIG. 2 is a circuit diagram illustrating an example of the pixel included in the display device shown in FIG. 1.

Referring to FIG. 2, a pixel PX may include a light emitting element LD and a driving circuit DC connected to the light emitting element LD to drive the light emitting element LD.

A first electrode (e.g., an anode electrode) of the light emitting element LD may be connected to the first power source VDD via the driving circuit DC, and a second electrode (e.g., a cathode electrode) of the light emitting element LD may be connected to the second power source VSS. The light emitting element LD may emit light with a luminance corresponding to an amount of driving current controlled by the driving circuit DC.

The light emitting element LD may be configured as an organic light emitting diode or an inorganic light emitting diode such as a micro LED (light emitting diode) or a quantum dot light emitting diode. Also, the light emitting element LD may be a light emitting element configured with a combination of an organic material and an inorganic material. In FIG. 2, it is illustrated that the pixel PX includes a single light emitting element LD. However, in another embodiment, the pixel PX may include a plurality of light emitting elements, and the plurality of light emitting elements may be connected in series, parallel, or series/parallel to each other.

The first power source VDD and the second power source VSS may have different potentials. For example, a voltage applied through the first power source VDD may be higher than a voltage applied through the second power source VSS.

The driving circuit DC may include a first transistor T1, a second transistor T2, and a storage capacitor Cst.

A first electrode of the first transistor T1 (driving transistor) may be connected to the first power source VDD, and a second electrode of the first transistor T1 may be connected to the first electrode (e.g., the anode electrode) of the light emitting element LD. A gate electrode of the first transistor T1 may be connected to a first node N1. The first transistor T1 may control an amount of driving current supplied to the light emitting element LD, corresponding to a data signal supplied to the first node N1 through a data line DL A first electrode of the second transistor T2 (switching transistor) may be connected to the data line DL, and a second electrode of the second transistor T2 may be connected to the first node N1. A gate electrode of the second transistor T2 may be connected to a scan line SL.

The second transistor T2 may be turned on when a scan signal supplied from the scan line SL having a certain voltage (e.g., a gate-on voltage) is applied to a gate terminal of the second transistor T2, to electrically connect the data line DL and the first node N1 to each other. A data signal of a corresponding frame may be supplied to the data line DL. Accordingly, the data signal may be transferred to the first node N1. A voltage corresponding to the data signal transferred to the first node N1 may be stored in the storage capacitor Cst.

One electrode of the storage capacitor Cst may be connected to the first node N1, and the other electrode of the storage capacitor Cst may be connected to the first electrode of the light emitting element LD. The storage capacitor Cst may be charged with the voltage corresponding to the data signal supplied to the first node N1, and maintain the charged voltage until a data signal of a next frame is supplied.

Meanwhile, for convenience of description, the pixel having a relatively simple form is illustrated in FIG. 2, and the structure of the driving circuit DC may be variously modified and embodied. In an example, the driving circuit DC may additionally further include various types of transistors such as a compensation transistor for compensating for a threshold voltage of the first transistor T1, an initialization transistor for initializing the first node N1, and/or an emission control transistor for controlling an emission time of the light emitting elements LD, or other circuit elements such as a boosting capacitor for boosting the voltage of the first node N1.

In addition, although a case where the transistors, e.g., the first and second transistors T1 and T2 included in the driving circuit DC are all N-type transistors has been illustrated in FIG. 2, the present disclosure is not limited thereto. That is, at least one of the first and second transistors T1 and T2 included in the driving circuit DC may be changed to a P-type transistor.

Figure 3:
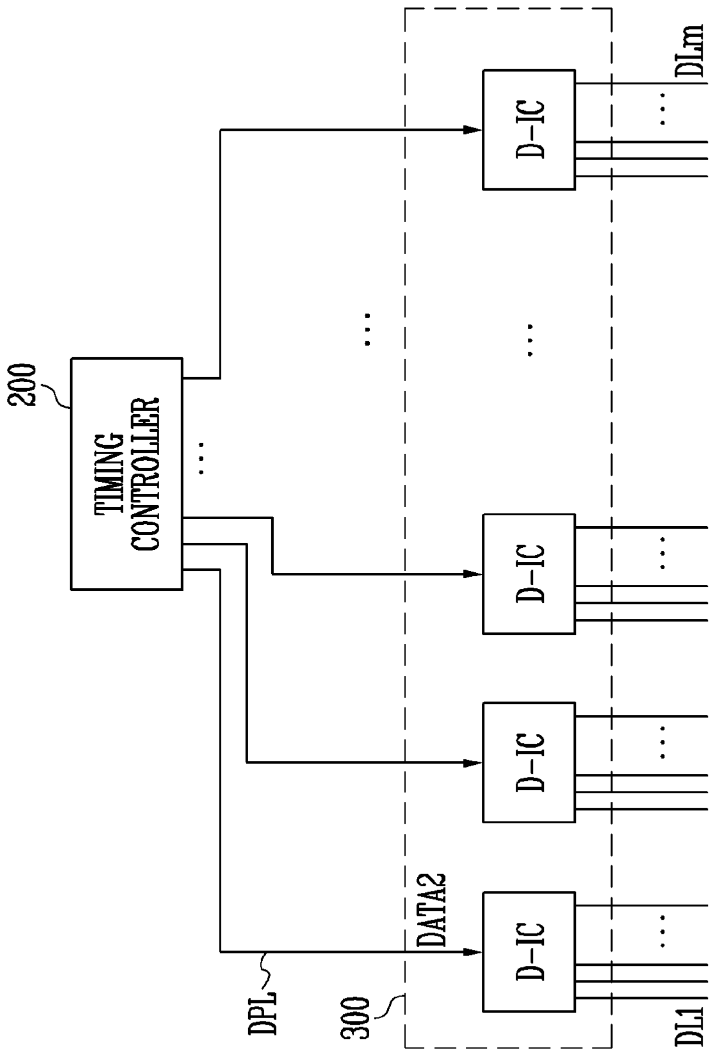
FIG. 3 is a diagram illustrating an example of a data clock signal line connecting a timing controller and a data driver, which are included in the display device shown in FIG. 1.

FIG. 3 is a diagram illustrating an example of the data clock signal line connecting the timing controller and the data driver, which are included in the display device shown in FIG. 1.

Referring to FIG. 3, the data driver 300 may include data driving circuits D-IC. The data driving circuits D-IC may be referred to as driver ICs or source ICs.

The data driving circuits D-IC may be connected to at least one data line among the data lines DL1 to DLm. For example, when the data driver 300 includes only one data driving circuit D-IC, the data driving circuit D-IC and the data driver 300 may be identical to each other. The data lines DL1 to DLm may all be connected to the data driving circuit D-IC. In another example, when the data driver 300 includes a plurality of data driving circuits D-IC, the data lines DL1 to DLm may be grouped, and each data line group may be connected to a corresponding data driving circuit D-IC. For example, the data driver 300 may include m data driving circuits D-IC of which number is equal to a number of the data lines DL1 to DLm. Each of the data line groups includes one data line, so that the m data driving circuits D-IC can be respectively connected to the m data lines DL1 to DLm (or data line groups). In another example, the data driving circuits D-IC may include m/j (j is an integer which is equal to or greater than 2 and is less than m) data driving circuits D-IC. Each of the data line groups includes j data lines, so that the m/j data driving circuits D-IC can be connected to j data lines (or data line groups) among the m data lines DL1 to DLm.

The timing controller 200 and the data driver 300 may be connected to each other through a data clock signal line DPL.

In an embodiment, the timing controller 200 may be connected to each of the data driving circuits D-IC included in the data driver 300 through the data clock signal line DPL. For example, a method in which the timing controller 200 is connected to the data driving circuits D-IC included in the data driver 300 through the data clock signal line DPL may be a point-to-point method. The data clock signal line DPL may include sub-data clock signal lines of which number is equal to a number of the data driving circuits D-IC. The timing controller 200 may be connected to the data driving circuits D-IC respectively through the sub-data clock signal lines.

However, the connection method between the timing controller 200 and the data driver 300 is not limited thereto. For example, the timing controller 200 and the data driving circuits D-IC of the data driver 300 may be commonly connected to each other by using a multi-drop method through the data clock signal line DPL.

The data clock signal line DPL may correspond to an interface for transmitting second data DATA2 provided to the data driver 300 (or the data driving circuits D-IC) from the timing controller 200. For example, the data clock signal line DPL may be a high speed serial interface. For example, the data clock signal line DPL may be a universal serial interface (USI), a universal serial interface for TV (USI-T), an ultra path interface (UP), a universal description, discovery, and integration (UDDI), or the like.

The second data DATA2 may be data in which a clock signal is embedded. For example, as described with reference to FIG. 1, the second data DATA2 may include a data control signal (clock training signal) corresponding to the first period (or vertical blank period) and image data corresponding to the second period (or active data period). Since the timing controller 200 and the data driving circuits D-IC included in the data driver 300 are connected to each other through the data clock signal line DPL, the timing controller 200 may supply second data DATA2 corresponding to each of the data driving circuits D-IC through the data clock signal line DPL.

Figure 4A:
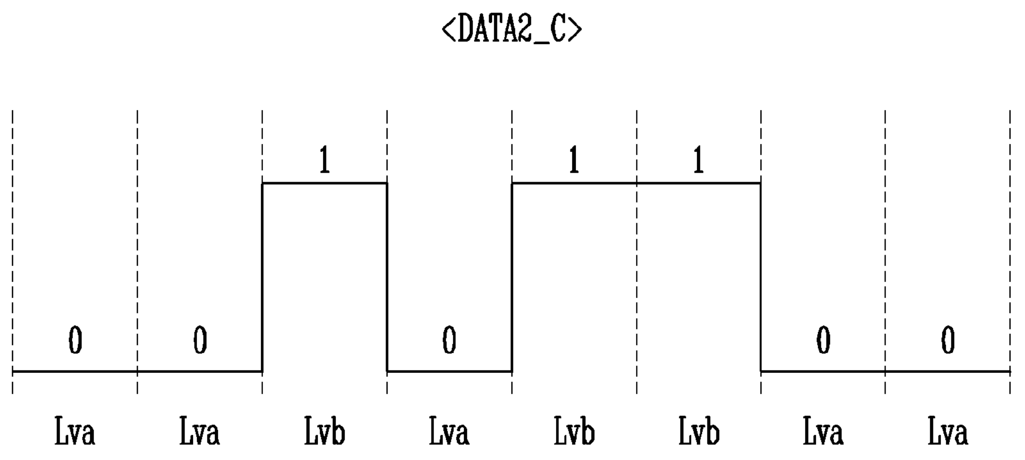
FIG. 4A is a waveform diagram illustrating a comparative example of a signal level of second data transmitted through the data clock signal line shown in FIG. 3.
Figure 4B:
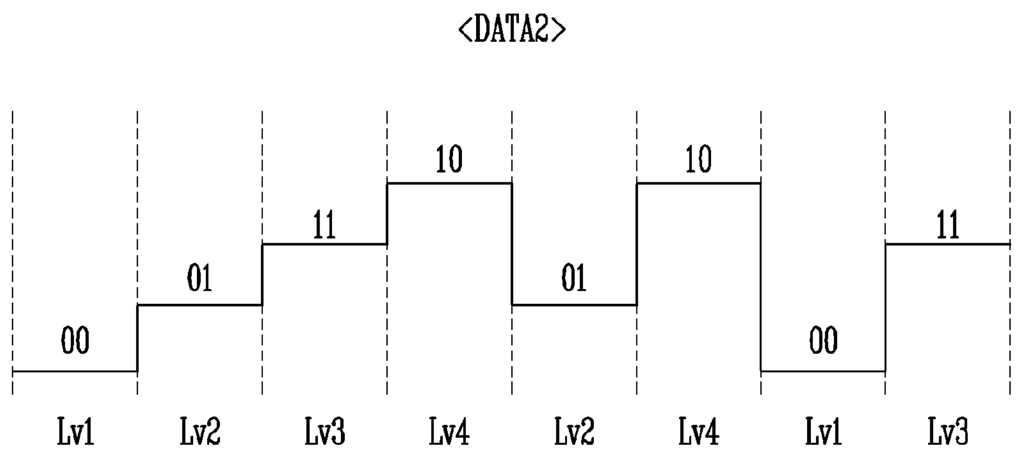
FIG. 4B is a waveform diagram illustrating an example of a signal level of second data transmitted through the data clock signal line shown in FIG. 3.

FIG. 4A is a waveform diagram illustrating a comparative example of a signal level of second data transmitted through the data clock signal line shown in FIG. 3. FIG. 4B is a waveform diagram illustrating an example of a signal level of second data transmitted through the data clock signal line shown in FIG. 3.

Referring to FIGS. 3 and 4A, second data DATA2_C in accordance with a comparative example of the present disclosure (e.g., an existing embodiment with respect to the present disclosure) may have two signal levels Lva and Lvb (or two voltage levels). For example, the second data DATA2_C may be data of which level can be expressed with one bit. That is, the second data DATA2_C may have one of a first signal level Lva as a value of '0' and a second signal level Lvb as a value of '1.'

As described above, the second data DATA2_C in accordance with the comparative example of the present disclosure may correspond to binary code data having one bit for each unit interval, i.e., a signal level (or low level) of 0 or a signal level (or high level) of 1. In an example, the second data DATA2_C may be packet data in a pulse amplitude modification 2-level (PAM2) format or packet data encoded in a non-return-to-zero (NRZ) format.

Referring to FIGS. 3 and 4B, second data DATA2 in accordance with an embodiment of the present disclosure may have four signal levels Lv1, Lv2, Lv3, and Lv4 (or four voltage levels). For example, the second data DATA2 may be data of which signal level can be expressed as two bits. That is, the second data DATA2 may have one of a first signal level Lv1 as a value of '00,' a second signal level Lv2 as a value of '01,' a third signal level Lv3 as a value of '11,' and a fourth signal level Lv4 as a value of '10.'

As described above, the second data DATA2 in accordance with an embodiment of the present disclosure may have two bits including a most significant bit (MSB) and a least significant bit (LSB) for each unit, i.e., four signal levels. In an example, the second data DATA2 may be packet data in the pulse amplitude modification level-4 (PAM4) described with reference to FIG. 1.

As described above, the second data DATA2 in accordance with an embodiment of the present disclosure has a number of signal levels (e.g., a number of bits), which is twice of a number of signal levels (e.g., a number of bits) of the second data DATA2_C in accordance with the comparative example, and hence a bandwidth can be decreased in half with respect to the same bit rate. Accordingly, in the second data DATA2 in accordance with an embodiment of the present disclosure, data can be more stably transmitted in a high speed interface.

In addition, as described with reference to FIG. 1, the data driver 300 (see FIG. 1) may determine a clock training period by using the signal levels (or bits) of the second data DATA2.

However, the signal levels of the second data DATA2 in accordance with an embodiments of the present disclosure is not limited thereto. For example, the third signal level Lv3 of the second data DATA2 may be the value of '10,' and the fourth signal level Lv4 of the second data DATA2 may be the value of '11.'

Hereinafter, a case where the third signal level Lv3 is the value of '11,' and the fourth signal level Lv4 is the value of '10' as shown in FIG. 4B will be mainly described.

Figure 5:
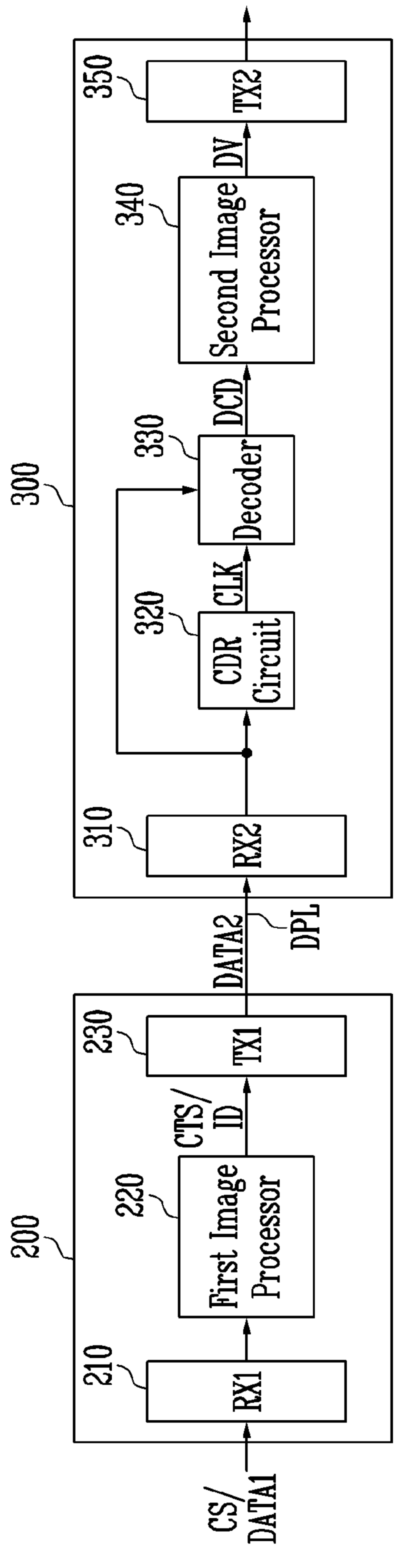
FIG. 5 is a block diagram illustrating an example of the timing controller and the data driver, which are included in the display device shown in FIG. 1.
Figure 6:
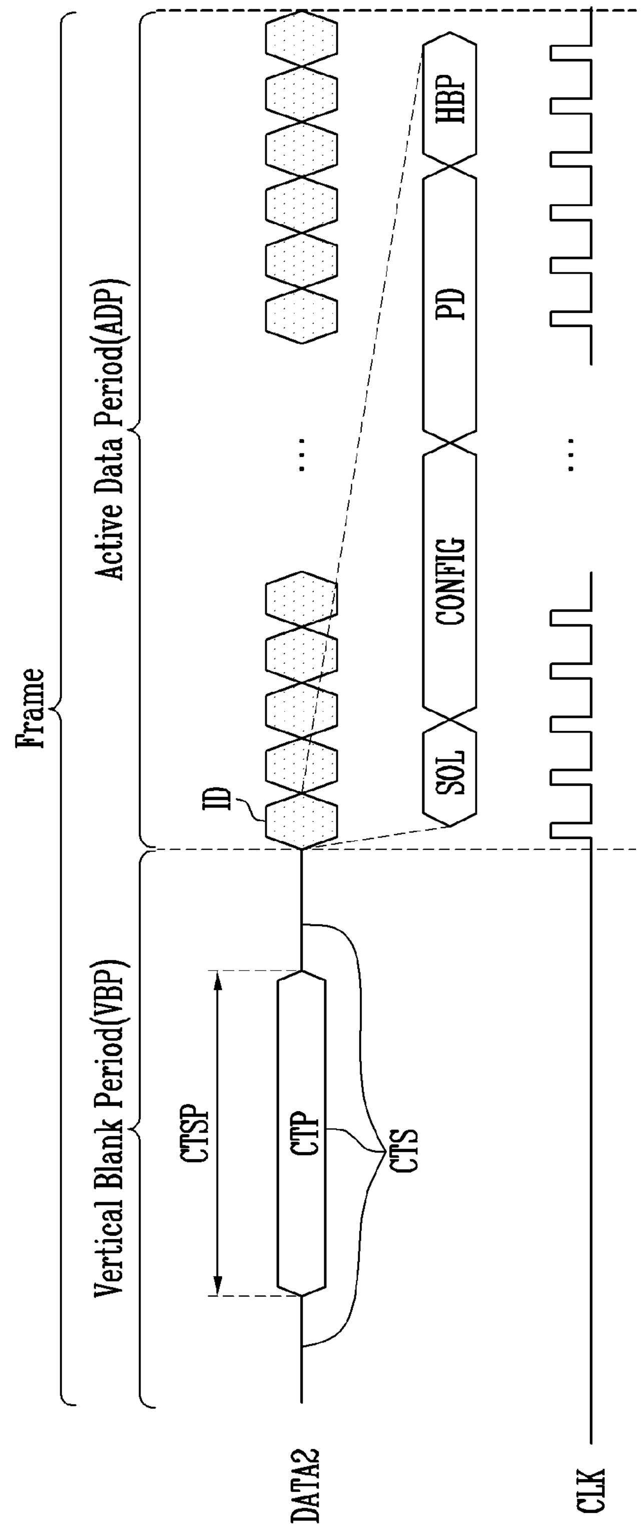
FIG. 6 is a diagram illustrating an example of the second data transmitted through the data clock signal line shown in FIG. 3.
Figure 7A:
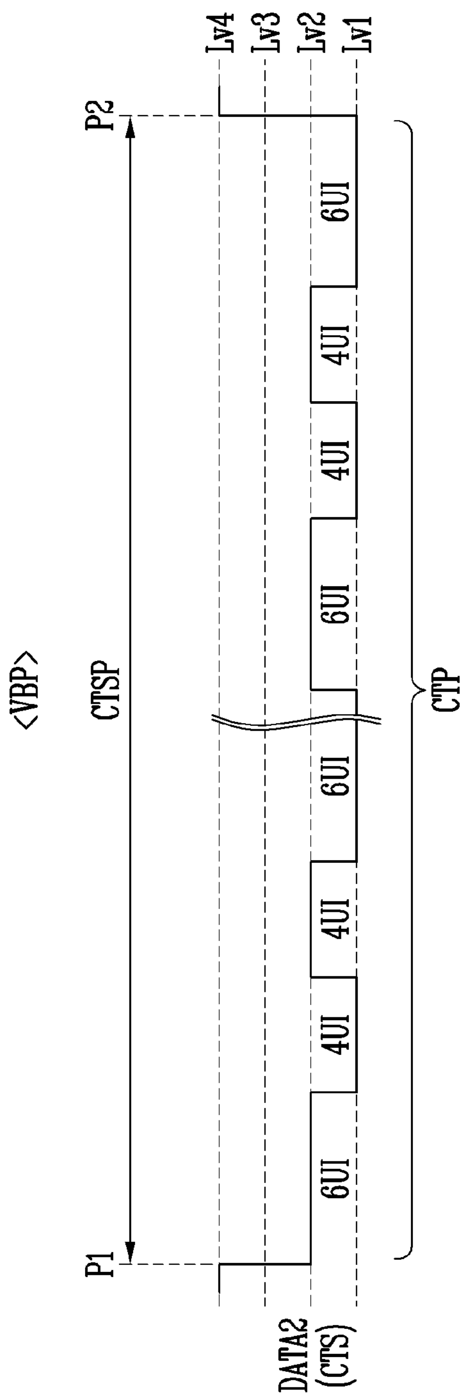
FIGS. 7A to 7C are waveform diagrams illustrating examples of a signal level of second data shown in FIG. 6 in a first period.
Figure 7B:
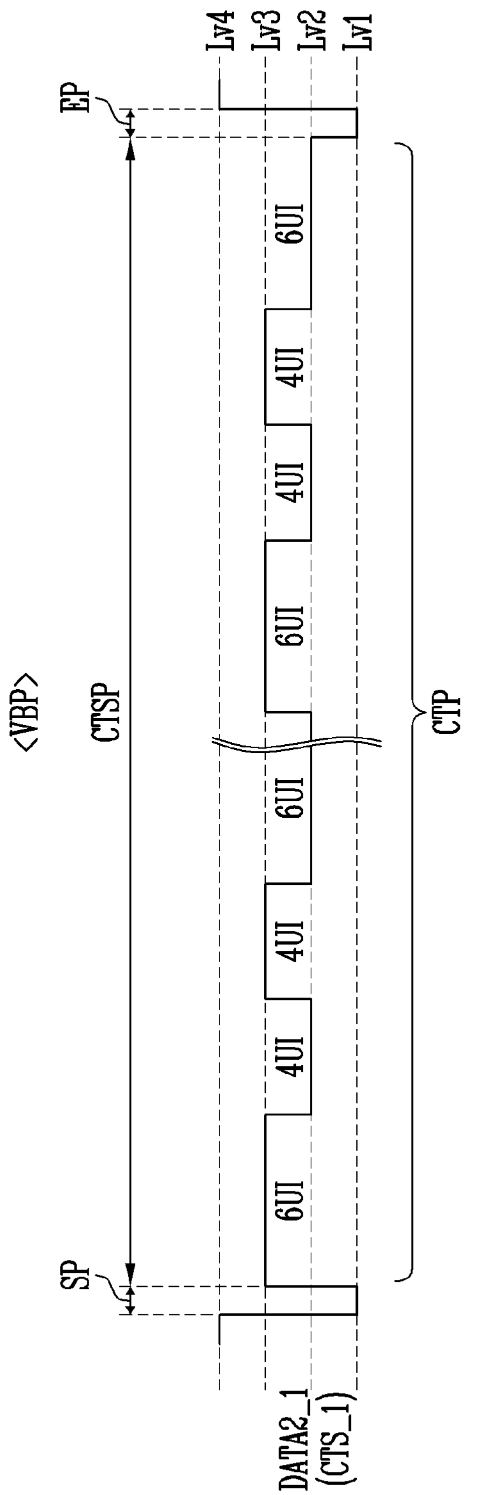
Figure 7C:
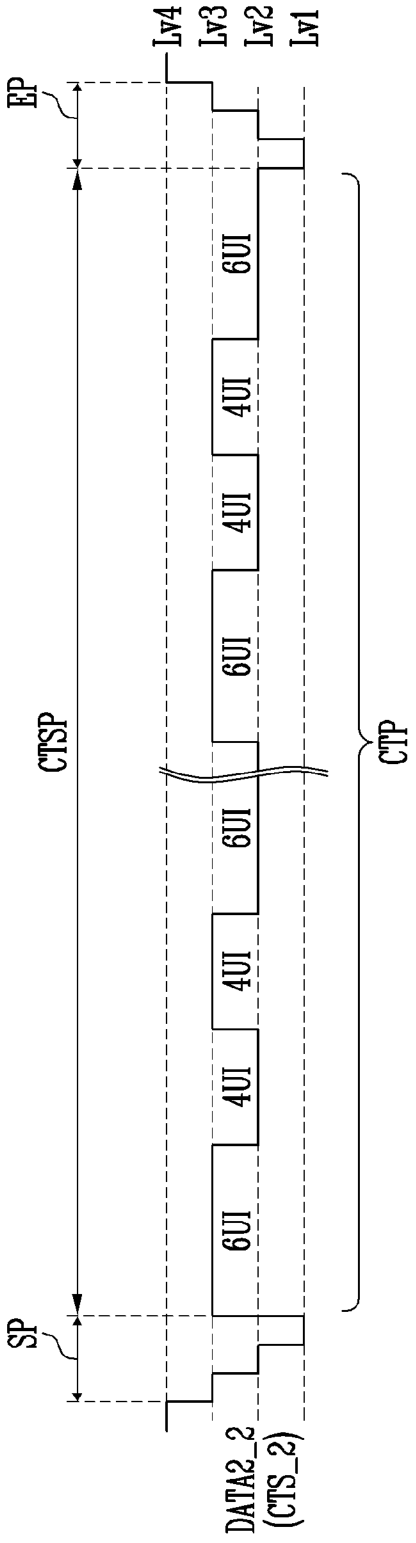

FIG. 5 is a block diagram illustrating an example of the timing controller and the data driver, which are included in the display device shown in FIG. 1. FIG. 6 is a diagram illustrating an example of the second data DATA2 transmitted through the data clock signal line DPL shown in FIG. 3. FIGS. 7A to 7C are waveform diagrams illustrating examples of a signal level of second data shown in FIG. 6 in a first period.

Meanwhile, although the data driver 300 connected to the timing controller 200 through the data clock signal line DPL is illustrated in FIG. 5, the timing controller 200 may be connected to each of the data driving circuits D-IC (see FIG. 3) of the data driver 300 through the data clock signal line DPL as described with reference to FIG. 3, and the data driver 300 shown in FIG. 5 may mean each of the data driving circuits D-IC (see FIG. 3). That is each of the data driving circuits D-IC shown in FIG. 3 may generate data signals, including components of the data driver 500 shown in FIG. 5, and provide the data signals to data lines DL1 to DLm (see FIG. 3) connected to each data driving circuit D-IC.

Referring to FIGS. 3 to 5, the timing controller 200 may include a first receiver 210, a first image processor 220, and a first transmitter 230.

The first receiver 210 may receive a control signal CS and first data DATA1 from the outside (e.g., a graphic processor), and provide the control signal CS and the first data DATA1 to the first image processor 220. For example, the first receiver 210 along with a transmitter (not shown) of the graphic processor may constitute one interface system. The first receiver 210 may include a receiving circuit corresponding to the transmitter of the graphic processor. For example, the first receiver 210 may be configured to receive and interpret a signal transmitted by the transmitter of the graphic processor. The control signal CS may include a clock signal CLK which will be described later, and the like.

The first image processor 220 may generate image data ID by realigning the first data DATA1, corresponding to the clock signal CLK included in the control signal CS. For example, the first image processor 220 may include a serializer.

The first image processor 220 may generate a data control signal, corresponding to the control signal CS. The data control signal may include the clock training signal CTS described with reference to FIG. 1.

The first transmitter 230 may transmit the data control signal (or the clock training signal CTS) and the image data ID to the data driver 300 through the data clock signal line DPL. In an embodiment, the first transmitter 230 may transmit the clock training signal CTS to the data driver 300, corresponding to a first period (or vertical blank period) of one frame period, and transmit the image data ID to the data driver 300, corresponding to a second period (or active data period) of the one frame period. The clock training signal CTS and the image data ID may be transmitted as one packet data (e.g., second data DATA2) through the data clock signal line DPL.

For example, further referring to FIG. 6, the second data DATA2 may include a clock training signal CTS, corresponding to a first period VBP (or vertical blank period) of one frame period Frame.

In an embodiment, the clock training signal CTS may have different signal levels in a clock training period CTPS in the first period VBP and a period except the clock training period CTPS in the first period VBP.

For example, a most significant bit (MSB) of the clock training signal CTS may have a value (or first value) of 0 in the clock training period CTSP in the first period VBP, and have a value (or second value) of 1 in the period except the clock training period CTSP in the first period VBP.

In an embodiment, further referring to FIG. 7A, the clock training signal CTS of the second data DATA2 may be maintained at a fourth signal level Lv4 in the period except the clock training period CTSP in the first period VBP. That is, the MSB of the clock training signal CTS may have the value (or second value) of 1 in the period except the clock training period CTSP in the first period VBP.

Also, the clock training signal CTS of the second data DATA2 may have signal levels (e.g., a first signal level Lv1 or a second signal level Lv2) corresponding to the clock training pattern CTP in the clock training period CTSP. That is, in the clock training period CTSP, the MSB of the clock training signal CTS may have the value (or first value) of 0, and a least significant bit (LSB) of the clock training signal CTS may have the value (first value or second value) of 0 or 1, corresponding to the clock training pattern CTP.

For example, as shown in FIG. 7A, in the case of an exemplary clock training pattern CTP in which a high level and a low level are repeated for each unit interval UI at 6:4 and 4:6 as a ratio of the high level to the low level (i.e., the high level and the low level are repeated for each of 6UI, 4UI, 4UI, and 6UI), the clock training signal CTS may have a signal level at which the second signal level Lv2 and the first signal level Lv1 are repeated for each of 6UI, 4UI, 4UI, and 6UI in the clock training period CTSP. That is, in the clock training period CTSP, the MSB of the clock training signal CTS may have the value (or first value) of 0, and the LSB of the clock training signal CTS may have one of the value (or second value) of 1 and the value (or first value) of 0, which are repeated for each of 6UI, 4UI, 4UI, and 6UI.

However, the signal level of the clock training signal CTS is not limited thereto.

For example, referring to FIG. 2, a clock training signal CTS_1 of second data DATA2_1 may include signal levels (or bits) having a specific pattern in front/back periods (e.g., a first sub-period SP and a second sub-period EP) of the clock training period CTSP. The first sub-period SP may mean a period before a time at which the clock training period CTSP is started, and the second sub-period EP may mean a period after a time at which the clock training period CTSP is ended.

As shown in FIG. 7B, the clock training signal CTS_1 may be maintained at the fourth signal level Lv4 in a period except the clock training period CTSP and the sub-periods SP and EP in the first period VBP (i.e., an MSB is 1 and an LSB is 0), and have the first signal level Lv1 in the sub-periods SP and EP.

Also, the clock training signal CTS_1 may have signal levels (e.g., the second signal level Lv2 or the third signal level Lv3) corresponding to the clock training pattern CTP in the clock training period CTSP. That is, in the clock training period CTSP, the MSB of the clock training signal CTS_1 may have the value (first value or second value) of 0 or 1, and the LSB of the clock training signal CTS_1 may have the value (or second value) of 1.

For example, as shown in FIG. 7B, corresponding to the exemplary clock training pattern CTP, the clock training signal CTS_1 may have a signal level at which the third signal level Lv3 and the second signal level Lv2 are repeated for each of 6UI, 4UI, 4UI, and 6UI. That is, in the clock training period CTSP, the MSB of the clock training signal CTS_1 may have one of the value (or second value) of 1 and the value (or first value) of 0, which are repeated for each of 6UI, 4UI, 4UI, and 6UI, and the LSB of the clock training signal CTS_1 may have the value (or second value) of 1.

However, the signal level of the clock training signal CTS_1 is not limited thereto, and may be variously set.

For example, further referring to FIG. 7C, a clock training signal CTS_2 may have a signal level having a pattern in which the signal level is sequentially decreased from the third signal level Lv3 to the first signal level Lv1 in the first sub-period SP, and have a signal level having a pattern in which the signal level is sequentially increased from the first signal level Lv1 to the third signal level Lv3 in the second sub-period EP.

Referring back to FIG. 6, the second data DATA2 may include image data ID, corresponding to a second period ADP (or active data period) of the one frame period Frame.

Each of the image data ID may include fields of a start of line SOL, a configuration CONFIG, pixel data PD, and a horizontal blank period HBP.

The start of line SOL may represent a start of each line of an image frame displayed on the pixel unit 100 (see FIG. 1). The start of line SOL may include a code having a specific edge or pattern so as to be distinguished from a horizontal blank field HBP of a current frame image with respect to a previous line or a first period VBP (or vertical blank period) between the current frame image and a previous frame image.

The configuration CONFIG may include configuration data for controlling the data driver 300. The configuration data may include frame configuration data for controlling a frame setting of an image frame or line configuration data for controlling a setting of each line or row. Also, the configuration data may include a frame synchronization signal activated when image data ID about a last line or row of the image frame is transmitted. The data driver 300 receives the activated frame synchronization signal, so that it can be determined that a first period VBP (or vertical blank period) has been started after current image data ID is received. In addition, the configuration data may include various kinds of control data.

The pixel data PD may include pixel data corresponding to a corresponding frame image.

The horizontal blank period HBP may be a period allocated such that the data driver 300 secures a time for driving the pixel unit 100 (see FIG. 1), based on the pixel data.

Referring back to FIG. 5, the data driver 300 may include a second receiver 310, a recovery unit 320 (or clock data recovery circuit), a decoder 330 (e.g., a logic circuit), a second image processor 340, and a second transmitter 350.

The second receiver 310 may receive the second data DATA2 from the timing controller 200 (or the first transmitter 230) through the data clock signal line DPL and provide the second data DATA2 to the recovery unit 320.

In some embodiments, the second receiver 310 may include an equalizer, and change (or equalize) a frequency gain of the second data DATA2 received through the data clock signal line DPL according to an equalizing option value and then provide the second data DATA2 to the recovery unit 320. Accordingly, signal distortion of the second data DATA2 provided through the data clock signal line DPL can be compensated.

The recovery unit 320 may generate (or recover) the clock signal CLK by using the second data DATA2 provided from the second receiver 310 (the second data DATA2 equalized by the equalizer of the second receiver 310).

The recovery unit 320 may determine the clock training period CTSP in the first period VBP, based on the signal level of the clock training signal CTS.

In an embodiment, the recovery unit 320 may determine the clock training period CTSP, based on the MSB of the clock training signal CTS.

For example, when the clock training signal CTS has the signal level described with reference to FIG. 7A, the recovery unit 320 may determine, as the clock training period CTSP, a period in which the MSB of the clock training signal CTS (or the second data DATA2) is 0 in the first period VBP.

In another example, the recovery unit 320 may extract times (e.g., a first time P1 and a second time P2) at which the MSB of the clock training signal CTS (or the second data DATA2) is changed in the first period VBP, and determine the clock training period CTSP by using the times P1 and P2. In an example, as shown in FIG. 7A, the MSB of the clock training signal CTS is changed from the value (or second value) of 1 to the value (or first value) of 0 at the first time P1 at which the clock training period CTSP is started, and the MSB of the clock training signal CTS is changed from the value (or first value) of 0 to the value (or second value) of 1 at the second time P2 at which the clock training period CTSP is ended. Therefore, the recovery unit 320 may extract the first and second times P1 and P2 at which the MSB of the clock training signal CTS is changed, and determine a period between the first and second times P1 and P2 as the clock training period CTSP. For example, the clock training period CTSP may be a difference of the first and second time P1 and P2.

In an embodiment, the recovery unit 320 may determine the clock training period CTSP, based on the signal levels of the specific pattern which the clock training signal CTS has.

For example, when the clock training signal CTS_1 or CTS_2 has the signal level described with reference to FIGS. 7B and 7C, the recovery unit 320 may extract periods, i.e., the first and second sub-periods SP and EP in which the clock training signal CTS_1 or CTS_2 has the signal level of the specific pattern described with reference to FIGS. 7B and 7C in the first period VBP, and determine the clock training period CTSP by using the first and second sub-periods SP and EP. In an example, the recovery unit 320 determines a period between the first and second sub-periods SP and EP as the clock training period CTSP. In some embodiments, the recovery unit 320 may further include a memory (not shown) in which information on the above-described signal level of the specific pattern is pre-stored, and extract the first and second sub-periods SP and EP by using the corresponding information.

The recovery unit 320 may generate (or recover) the clock signal CLK by using the clock training pattern CTP included in the clock training signal CTS in the determined clock training period CTSP.

While above, it has been described that the recovery unit 320 determines the clock training period CTSP, based on the signal level of the clock training signal CTS, CTS_1 or CTS_2, embodiments of the present disclosure are not limited thereto. For example, the data driver 300 may include a separate component (e.g., a logic circuit or the like) for determining the clock training period CTSP, thereby determining the clock training period CTSP. The recovery unit 320 may generate (or recover) the clock signal CLK in the clock training period CTSP under the control of the component which determines the clock training period CTSP.

The decoder 330 may receive the clock signal CLK from the recovery unit 320, and receive the second data DATA2 from the second receiver 310. The decoder 330 may sample a data signal from the second data DATA2 by using the clock signal CLK, and provide the sampled data signal DCD to the second image processor 340. For example, the recovered clock signal CLK may provide timing to the decoder 330 so that the decoder 330 may determine which portion of the image data corresponds to each row of the pixel unit 100.

The second image processor 340 may generate data signals DV by receiving the sampled data signal DCD from the decoder 330, and provide the data signals DV to the data lines DL1 to DLm (see FIG. 1) through the second transmitter 350.

As described with reference to FIGS. 5, 6, and 7A to 7C, the timing controller 200 and the data driver 300 in accordance with the embodiments of the present disclosure may transmit/receive the second data DATA2 through the data clock signal line DPL. The second data DATA2 may be packet data in the multi-level signal modulation format, and have four signal levels. Accordingly, the data driver 300 can determine the clock training period CTSP by using the signal levels of the second data DATA2. Thus, a separate signal line for providing a clock training period notification signal between the timing controller 200 and the data driver 300 is omitted, and hence the number of signal lines for signal transmission between the timing controller 200 and the data driver 300 can be decreased.

In a display device in accordance with an embodiment of the present disclosure, a clock training period of a vertical blank period may be determined by using second data transmitted through a data clock signal line. Accordingly, a separate signal line for providing a clock training period notification signal is omitted, and thus the number of signal lines for signal transmission between the timing controller and the data driver can be decreased.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a timing controller configured to supply a clock training signal through a data clock signal line in a first period of one frame period, and supply image data through the data clock signal line in a second period of the one frame period;

a data driver configured to generate a clock signal, based on the clock training signal in a clock training period in the first period, and generate a data signal, based on the clock signal and the image data in the second period; and a pixel unit configured to display an image, based on the data signal, wherein the clock training signal includes a plurality of signal levels, and wherein the data driver determines the clock training period, based on the signal levels of the clock training signal, wherein the clock training signal includes a first bit and a second bit, which correspond to each of the signal levels, and wherein the data driver determines the clock training period, based on the first bit of the clock training signal.

2. The display device of claim 1, wherein the first bit of the clock training signal has a first value in the clock training period in the first period, and has a second value in a period except the clock training period in the first period.

3. The display device of claim 2, wherein the data driver determines, as the clock training period, a period in which the first bit of the clock training signal has the first value in the first period.

4. The display device of claim 2, wherein the data driver determines, as the clock training period, a period between times at which the first bit of the clock training signal is changed in the first period.

5. The display device of claim 2, wherein the data driver generates the clock signal, corresponding to the second bit of the clock training signal in the clock training period.

6. The display device of claim 1, wherein the clock training signal includes 2-bit signal levels.

7. The display device of claim 1, wherein the data driver includes a plurality of data driving circuits,
   wherein the data clock signal line includes a plurality of sub-data clock signal lines, and
   wherein the timing controller is connected to the data driving circuits respectively through the plurality of sub-data clock signal lines.

8. A display device of claim 1, comprising:
   a timing controller configured to supply a clock training signal through a data clock signal line in a first period of one frame period, and supply image data through the data clock signal line in a second period of the one frame period;
   a data driver configured to generate a clock signal, based on the clock training signal in a clock training period in the first period, and generate a data signal, based on the clock signal and the image data in the second period; and
   a pixel unit configured to display an image, based on the data signal,
   wherein the clock training signal includes a plurality of signal levels, and
   wherein the data driver determines the clock training period, based on the signal levels of the clock training signal,
   wherein the clock training signal has a predetermined signal level in sub-periods different from the clock training period in the first period.

9. The display device of claim 8, wherein the data driver extracts the sub-periods, based on the predetermined signal level, and determines a period between the sub-periods as the clock training period.

10. The display device of claim 8, wherein the sub-periods include a first sub-period and a second sub-period, and
   wherein the clock training signal has one signal level among a first signal level, a second signal level greater than the first signal level, a third signal level greater than the second signal level, and a fourth signal level greater than the third signal level.

11. The display device of claim 10, wherein the clock training signal has the first signal level in the first sub-period and the second sub-period.

12. The display device of claim 10, wherein the clock training signal:
   has a signal level which sequentially decreases from the third signal level to the first signal level in the first sub-period; and
   has a signal level which sequentially increases from the first signal level to the third signal level in the second sub-period.

13. The display device of claim 10, wherein the clock training signal:
   has the second signal level or the third signal level in the clock training period; and
   has the fourth signal level in a period except the first sub-period, the second period, and the clock training period in the first period.

14. The display device of claim 13, wherein the data driver generates the clock signal, corresponding to the clock training signal having the second signal level or the third signal level in the clock training period.

15. A method of driving a display device, the method comprising:
   supplying a clock training signal including a plurality of signal levels through a data clock signal line in a first period of one frame period;
   supplying image data through the data clock signal line in a second period of the one frame period;
   determining a clock training period in the first period, based on the signal levels of the clock training signal;
   generating a clock signal, based on the clock training signal in the clock training period in the first period;
   generating a data signal, based on the clock signal and the image data in the second period; and
   displaying an image, based on the data signal,
   wherein the clock training signal includes a first bit and a second bit, which correspond to each of the signal levels, and
   wherein, in the determining of the clock training period, the clock training period is determined based on the first bit of the clock training signal.

16. The method of claim 15, wherein, in the generating of the clock signal, the clock signal is generated corresponding to the second bit of the clock training signal.

17. The method of claim 15, wherein the clock training signal has a predetermined signal level in sub-periods different from the clock training period in the first period.

18. The method of claim 17, wherein, in the determining of the clock training period, the sub-periods are extracted based on the predetermined signal level, and a period between the sub-periods is determined as the clock training period.

19. A display device comprising:
   a timing controller configured to supply a clock training signal through a data clock signal line in a first period of one frame period, and supply image data through the data clock signal line in a second period of the one frame period;
   a data driver configured to generate a clock signal, based on the clock training signal in a clock training period in the first period, and generate a data signal, based on the clock signal and the image data in the second period; and
   a pixel unit configured to display an image, based on the data signal,
   wherein the clock training signal includes first, second, and third signal levels that are different from one another, and
   wherein the data driver determines a start of the clock training period by detecting the clock training signal transitioning from the third signal level to one of the first and second signal levels.

* * * * *